(12) United States Patent
Tsai

(10) Patent No.: US 11,704,215 B2
(45) Date of Patent: Jul. 18, 2023

(54) CENTRAL PROCESSING UNIT

(71) Applicant: REALTEK SEMICONDUCTOR CORP., Hsinchu (TW)

(72) Inventor: Yen-Ting Tsai, Hsinchu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 28 days.

(21) Appl. No.: 17/205,656

(22) Filed: Mar. 18, 2021

(65) Prior Publication Data

US 2022/0188204 A1 Jun. 16, 2022

(30) Foreign Application Priority Data

Dec. 14, 2020 (TW) ................................. 109144143

(51) Int. Cl.
*G06F 11/00* (2006.01)
*G06F 11/263* (2006.01)
*G06F 13/16* (2006.01)
*G06F 13/20* (2006.01)
*G06F 11/22* (2006.01)

(52) U.S. Cl.
CPC ........ *G06F 11/263* (2013.01); *G06F 11/2236* (2013.01); *G06F 13/1668* (2013.01); *G06F 13/20* (2013.01)

(58) Field of Classification Search
CPC .... G06F 11/263; G06F 13/1668; G06F 13/20; G06F 11/2236
See application file for complete search history.

(56) References Cited

U.S. PATENT DOCUMENTS

| 6,314,530 | B1* | 11/2001 | Mann | G06F 11/3648 |
| | | | | 714/E11.212 |
| 6,532,553 | B1* | 3/2003 | Gwilt | G06F 11/3636 |
| | | | | 712/42 |
| 6,708,289 | B1* | 3/2004 | Kudo | G06F 11/3648 |
| | | | | 714/E11.21 |
| 7,665,002 | B1* | 2/2010 | White | G01R 31/31705 |
| | | | | 714/733 |
| 2003/0115528 | A1* | 6/2003 | Tanaka | G11C 29/46 |
| | | | | 714/742 |
| 2005/0268195 | A1* | 12/2005 | Lund | G06F 11/3648 |
| | | | | 714/741 |
| 2006/0150023 | A1* | 7/2006 | Hasebe | G06F 11/2242 |
| | | | | 714/38.1 |
| 2008/0162071 | A1* | 7/2008 | Stevens | G01R 31/318569 |
| | | | | 714/E11.16 |

(Continued)

FOREIGN PATENT DOCUMENTS

CN 111324493 A 6/2020

OTHER PUBLICATIONS

Arm® v8-M Architecture Reference Manual, 2015-2018, pp. 931-936.

*Primary Examiner* — Loan L. T. Truong
(74) *Attorney, Agent, or Firm* — Birch, Stewart, Kolasch & Birch, LLP

(57) ABSTRACT

A central processing unit includes a core, a state memory, a plurality of bus contacts, a data generation unit, and a bus interface unit. The state memory stores a state, the bus interface unit is coupled to the core and the state memory, and the bus interface unit selectively couples the core to the plurality of bus contacts or the data generation unit according to the state.

18 Claims, 6 Drawing Sheets

(56) References Cited

U.S. PATENT DOCUMENTS

| | | | |
|---|---|---|---|
| 2008/0256288 A1* | 10/2008 | Matsuoka | G06F 12/1433 |
| | | | 711/E12.001 |
| 2009/0187747 A1 | 7/2009 | Mayer et al. | |
| 2010/0095154 A1* | 4/2010 | Shih | G06F 11/3648 |
| | | | 714/30 |
| 2012/0131309 A1* | 5/2012 | Johnson | G06F 8/40 |
| | | | 712/E9.004 |
| 2012/0173825 A1* | 7/2012 | Ehrlich | G06F 11/362 |
| | | | 711/E12.033 |
| 2013/0198566 A1* | 8/2013 | Bastimane | G06F 11/26 |
| | | | 714/E11.169 |
| 2015/0154093 A1* | 6/2015 | Probyn | G06F 11/221 |
| | | | 714/37 |
| 2016/0187420 A1 | 6/2016 | Trethewey et al. | |
| 2017/0308454 A1 | 10/2017 | Adeeb et al. | |
| 2020/0371754 A1* | 11/2020 | P K | G06F 40/56 |
| 2021/0123973 A1* | 4/2021 | Zhu | G06F 1/32 |
| 2021/0263833 A1* | 8/2021 | Reisner | G06F 11/3624 |

\* cited by examiner

CENTRAL PROCESSING UNIT

CROSS-REFERENCE TO RELATED APPLICATION

This non-provisional application claims priority under 35 U.S.C. § 119(a) to Patent Application No. 109144143 filed in Taiwan, R.O.C. on Dec. 14, 2020, the entire contents of which are hereby incorporated by reference.

BACKGROUND

Technical Field

The present disclosure relates to a central processing unit.

Related Art

The debugging function of the central processing unit (CPU) usually refers to software debugging. When the CPU executes a program and the program execution returns unexpected results, a user may use a debugging device to control the CPU to enter a debug mode. When the CPU is in the debug mode, the user can check the history of the CPU by reading a register and a memory inside a core of the CPU to analyze and clarify the source of the unexpected behavior, thereby correcting potential software-related problems.

Under normal operations, the CPU will respond to the request of the debugging device to enter the debug mode. However, some situation may stop the CPU from responding to the request of the debugging device so that the CPU may fail to enter the debug mode. For example, when the core of the CPU is busy reading from or writing to the memory, some no-response problems or data loss on the memory or the BUS may cause the core of the CPU unable to complete the instruction and to fail to respond to the request for entering the debug mode.

According to the conventional approach, the user may force the CPU core to abandon the unfinished instruction by turning on a specific register switch inside the CPU core, so that the CPU core may respond to the request to enter the debug mode. However, this approach cannot guarantee the reasonability of the internal operation of the CPU, it may increase the difficulty of analysis. In addition, forcing the CPU core to abandon the unfinished instruction requires comprehensive control that involves all the circuits of the CPU core. For example, in order to allow the CPU core to force the abandonment of the unfinished instruction, a rarely executed circuit control should be added to the CPU (e.g., forcibly abandoning the unfinished circuit control for reading or writing to the memory). Furthermore, in order to achieve the operation of opening the register inside the CPU core while the CPU core is busy reading or writing to the memory, the complexity of circuits in the CPU core will increase. The increased complexity not only raises the cost, but also potentially causes unexpected problems for supporting this method, which also increases the difficulty of debugging.

SUMMARY

Based on the above, in some embodiments, a CPU includes a core, a state memory, a plurality of bus contacts, a data generation unit, and a bus interface unit. The state memory stores a state, the bus interface unit is coupled to the core and the state memory, and the bus interface unit selectively couples the core to the plurality of bus contacts or the data generation unit according to the state.

In some embodiments, a CPU includes a plurality of cores, a state memory, a plurality of bus contacts, a data generation unit, and a bus interface unit. The state memory stores a state, the bus interface unit is coupled to the cores and the state memory, and the bus interface unit selectively couples the plurality of cores to the plurality of bus contacts or the data generation unit according to the state.

DETAILED DESCRIPTION

Figure 1:
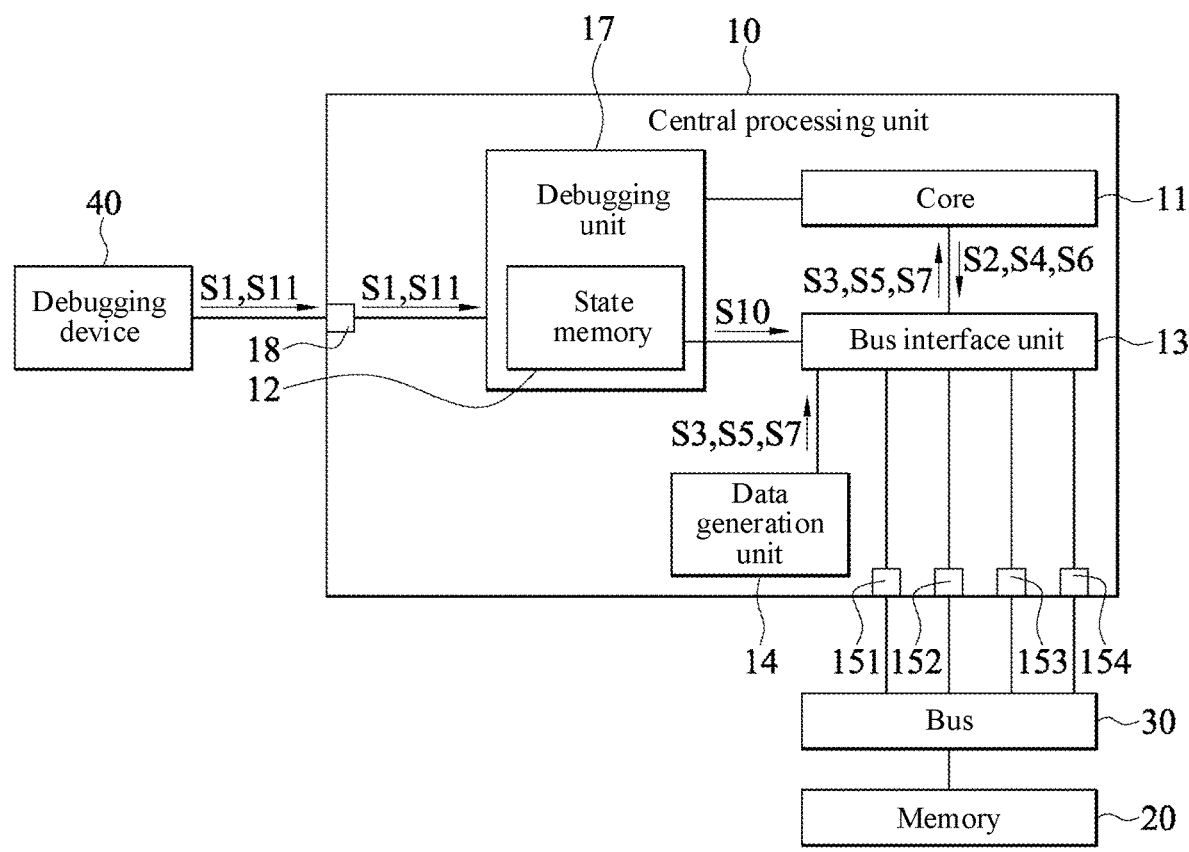
FIG. 1 is a block diagram of an embodiment of a CPU according to the present disclosure.

Referring to FIG. 1, a CPU 10 includes a core 11, a state memory 12, a bus interface unit 13, a data generation unit 14, and a plurality of bus contacts 151-154. The core 11 and the state memory 12 are respectively coupled to the bus interface unit 13. The plurality of bus contacts 151-154 are substantially located at one side of the CPU 10. The CPU 10 may communicate with external components of the CPU 10 through the bus contacts 151-154. The number of the bus contacts is not limited, and the number may be determined according to the length of the message required for communication with the external components. FIG. 1 shows an exemplary embodiment with four bus contacts 151-154. The state memory 12 may be a register, the state memory 12 stores a state (or say state information), and the bus interface unit 13 selectively couples the core 11 to the bus contacts 151-154 or couples the core 11 to the data generation unit 14 according to the state. In other words, when the state memory 12 is in a default state, the bus interface unit 13 is configured to couple the core 11 to the bus contacts 151-154; and when the state memory 12 is in another default state, the bus interface unit 13 is configured to couple the core 11 to the data generation unit 14.

Based on this, during operation, an external device (such as a debugging device 40) may directly or indirectly set the state of the state memory 12, and the bus interface unit 13 may selectively couple the core 11 to the bus contacts 151-154 or the data generation unit 14 according to the state of the state memory 12. For example, the external device may set the state of the state memory 12 to a normal state or an intervening state. When the state of the state memory 12 indicates the normal state, the bus interface unit 13 couples the core 11 to the bus contacts 151-154, and the core 11 can receive the message from the external device (such as a memory 20). When the core 11 continues to wait for the message transmitted by the memory 20 and a user cannot interrupt the waiting of the core 11, the user may directly or indirectly set the state of the state memory 12 from the normal state to the intervening state through a communication port 18, and the bus interface unit 13 couples the core 11 to the data generation unit 14 according to the intervening state, so that the core 11 can receive the message from the data generation unit 14 and stop waiting for the message from the memory 20 according to the received message.

In some embodiments, as shown in FIG. 1, a bus 30 is coupled between the CPU 10 and the memory 20. The bus 30 may be used as a communication channel between the CPU 10 and the memory 20, so that the core 11 can read data from and write data to the memory 20 via the bus 30 through the bus contacts 151-154. The above default state may be the normal state, and another default state may be the intervening state. When the state of the state memory 12 indicates the normal state, the bus interface unit 13 may couple the core 11 to the bus contacts 151-154, so that the core 11 can operate in a normal operation state to communicate with the memory 20 outside the CPU 10 via the bus contacts 151-154 and the bus 30, and the core 11 can read or write to the memory 20 via the bus contacts 151-154 and the bus 30. When the CPU 10 operates in an abnormal operation state, that is, when the core 11 fails to receive the message transmitted from the memory 20 for a period of time, the state stored in the state memory 12 may be changed to the intervening state so that the bus interface unit 13 interrupts the coupling between the core 11 and the memory 20. In this case, the bus interface unit 13 couples the core 11 to the data generation unit 14 and the core 11 is changed to communicate with the data generation unit 14 inside the CPU 10 so that the core 11 can receive the message from the data generation unit 14, and after receiving the message, the core 11 can stop waiting for the message from the memory 20.

In some embodiments, the CPU 10 may be operated in a debug mode, and the user may switch the CPU 10 to the debug mode to perform a debugging function on the CPU 10. As shown in FIG. 1, the CPU 10 further includes a debugging unit 17 and a communication port 18, the communication port 18 is also located at one side of the CPU 10, and the CPU 10 can communicate with external components of the CPU 10 through the communication port 18. For example, the communication port 18 may be coupled to the debugging device 40 outside the CPU 10, and the user may operate the debugging device 40 to provide a signal S1 for debugging to debug the CPU 10. In detail, the communication port 18 is coupled to the debugging unit 17, the debugging unit 17 includes the state memory 12, and the debugging unit 17 is coupled to the cores 11 and 16 and the bus interface unit 13. The debugging unit 17 may observe the behavior of the core 11 and read the register state of the core 11 according to the debugging signal received from the debugging device 40, and the debugging unit 17 may also receive the signal S1 transmitted from the debugging device 40 via the communication port 18 and selectively set the state of the state memory 12 according to the signal S1, so that the state of the state memory 12 may show either the normal state or the intervening state.

When the state of the state memory 12 shows the normal state, the core 11 stores a read instruction S2 in the bus interface unit 13 and waits for a response message from the memory 20. When the core 11 fails to receive the message returned from the memory 20 for a period of time, the user may want to execute the debugging function of the CPU 10. However, it is possible that the core 11 keeps waiting for the message from the memory 20 and fails to respond to the debugging request so as to enter the debug mode smoothly. At this time, the user can control the debugging device 40 to transmit the signal S1, and the CPU 10 receives the signal S1 via the communication port 18 and transmits the signal S1 to the debugging unit 17. The debugging device 40 may be a J-link probe, a u-link probe or a D-stream probe, and is coupled to the communication port 18 through a joint test action group (JTAG). The debugging unit 17 sets the state of the state memory 12 to the intervening state according to the signal S1, the bus interface unit 13 couples the core 11 to the data generation unit 14, and the data generation unit 14 may generate corresponding dummy data S3 according to the read instruction S2 issued by the CPU 10 to the memory 20. The data generation unit 14 transmits the dummy data S3 to the bus interface unit 13, and then, the bus interface unit 13 transmits the dummy data S3 to the core 11. When the core 11 receives the dummy data S3 corresponding to the read instruction S2, the core 11 can escape from waiting for the message returned from the memory 20, and then, the CPU 10 can enter the debug mode smoothly (i.e., the dummy data S3 is not limited to any specific content, and it's purpose is for the CPU 10 to determine that the memory 20 has returned the message).

Figure 2:
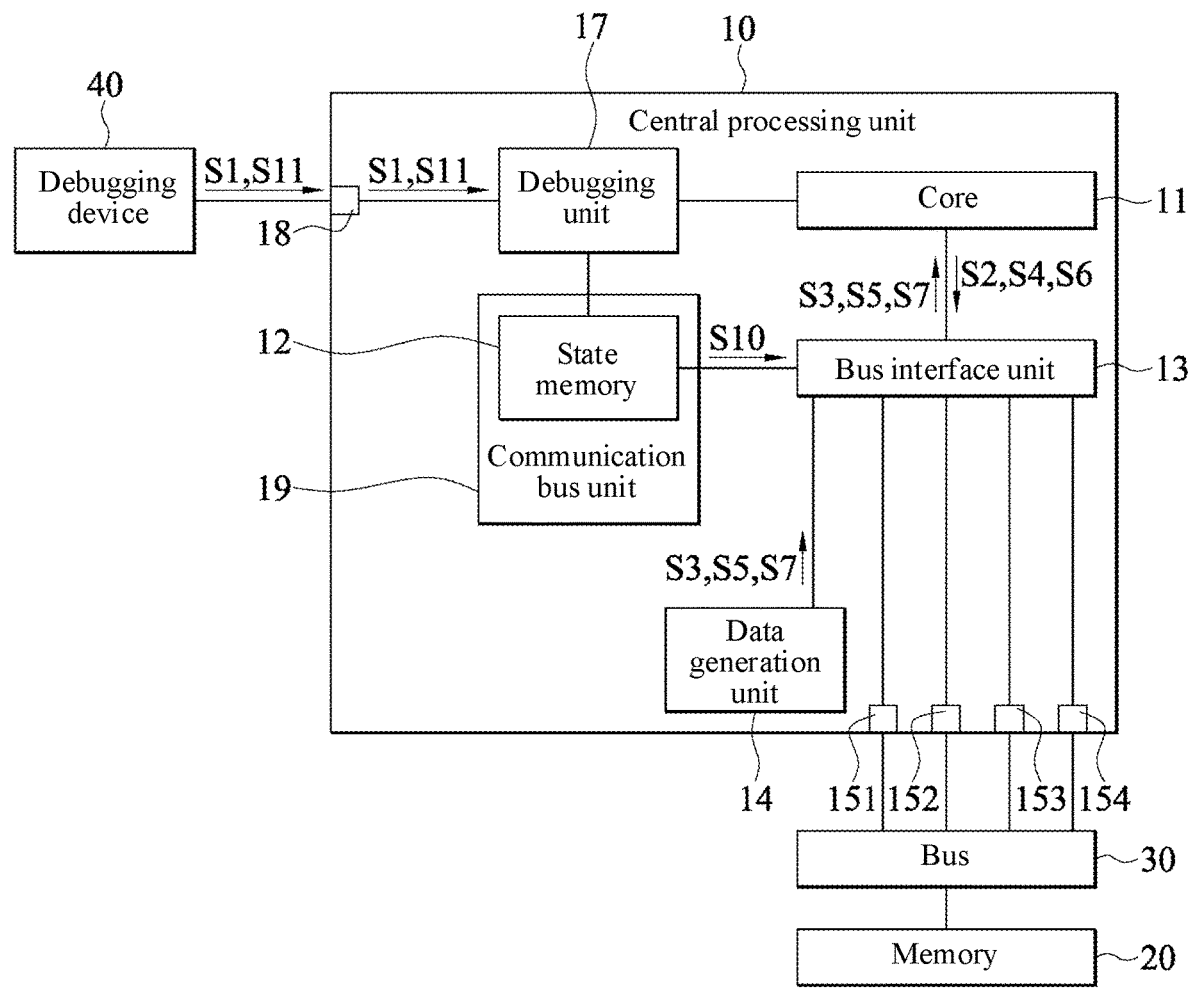
FIG. 2 is a block diagram of another embodiment of the CPU according to the present disclosure.

In some other embodiments, the state memory 12 is not limited to be an internal element of the debugging unit 17. As shown in FIG. 2, the state memory 12 may also be located in a serial communication bus unit 19 and coupled to the debugging unit 17 and the bus interface unit 13. The serial communication bus unit 19 may be, but is not limited to, a universal asynchronous receiver/transmitter (UART) or an inter-integrated circuit (I2C). The debugging device 40 may be a console application of computer equipment, such as a command-line interface (CLI). The user may use a keyboard to enter a command to stop the core 11 from waiting for the return message on the CLI, the debugging device 40 transmits the signal S1 for debugging according to the command, the signal S1 is transmitted to the debugging unit 17 via the communication port 18, and the debugging unit 17 may selectively set the state of the state memory 12 according to the signal S1 so that the state of the state memory 12 shows the normal state or the intervening state. When the debugging unit 17 sets the state of the state memory 12 to the intervening state according to the signal S1, the bus interface unit 13 couples the core 11 to the data generation unit 14, the data generation unit 14 generates the corresponding dummy data S3 according to the read instruction S2 and transmits the dummy data to the bus interface unit 13. The bus interface unit 13 transmits the dummy data S3 to the core 11, and the core 11 finishes waiting for the message returned from the memory 20 according to the received dummy data S3 corresponding to the read instruction S2, so that the CPU 10 can respond to the debugging request and enter the debug mode.

In some embodiments, if the core 11 can enter the debug mode smoothly after receiving the dummy data S3, the debugging device 40 can transmit another signal S11 to the debugging unit 17 via the communication port 18, the debugging unit 17 can restore the state of the state memory 12 to the normal state according to another signal, and then, the CPU 10 performs the debugging operation in the debug mode.

In some embodiments, the bus interface unit 13 can detect the state memory 12 routinely, that is, the bus interface unit 13 can perform an active visit to read the state of the state memory 12 and make a determination according to a fixed cycle or a dynamic cycle. When the bus interface unit 13 determines that the state of the state memory 12 shows the normal state, the bus interface unit 13 couples the core 11 to the bus contacts 151-154. When the bus interface unit 13 determines that the state of the state memory 12 shows the intervening state, the bus interface unit 13 couples the core 11 to the data generation unit 14.

In some other embodiments, the bus interface unit 13 can also receive a trigger signal S10 when the state of the state memory 12 changes (e.g., from the normal state to the intervening state or from the intervening state to the normal state), and then, the bus interface unit 13 couples the core 11 to the bus contacts 151-154 or couples the core 11 to the data generation unit 14 according to the trigger signal S10.

In some embodiments, for example, when the state stored in the state memory 12 indicates the normal state, the state memory 12 can store a value of logic "1"; and when the state stored in the state memory 12 indicates the intervening state, the state memory 12 can store a value of logic "0". That is, when the logic value corresponding to the state memory 12 is "1", the bus interface unit 13 couples the core 11 to the bus contacts 151-154; and when the logic value corresponding to the state memory 12 is "0", the bus interface unit 13 couples the core 11 to the data generation unit 14.

Figure 3:
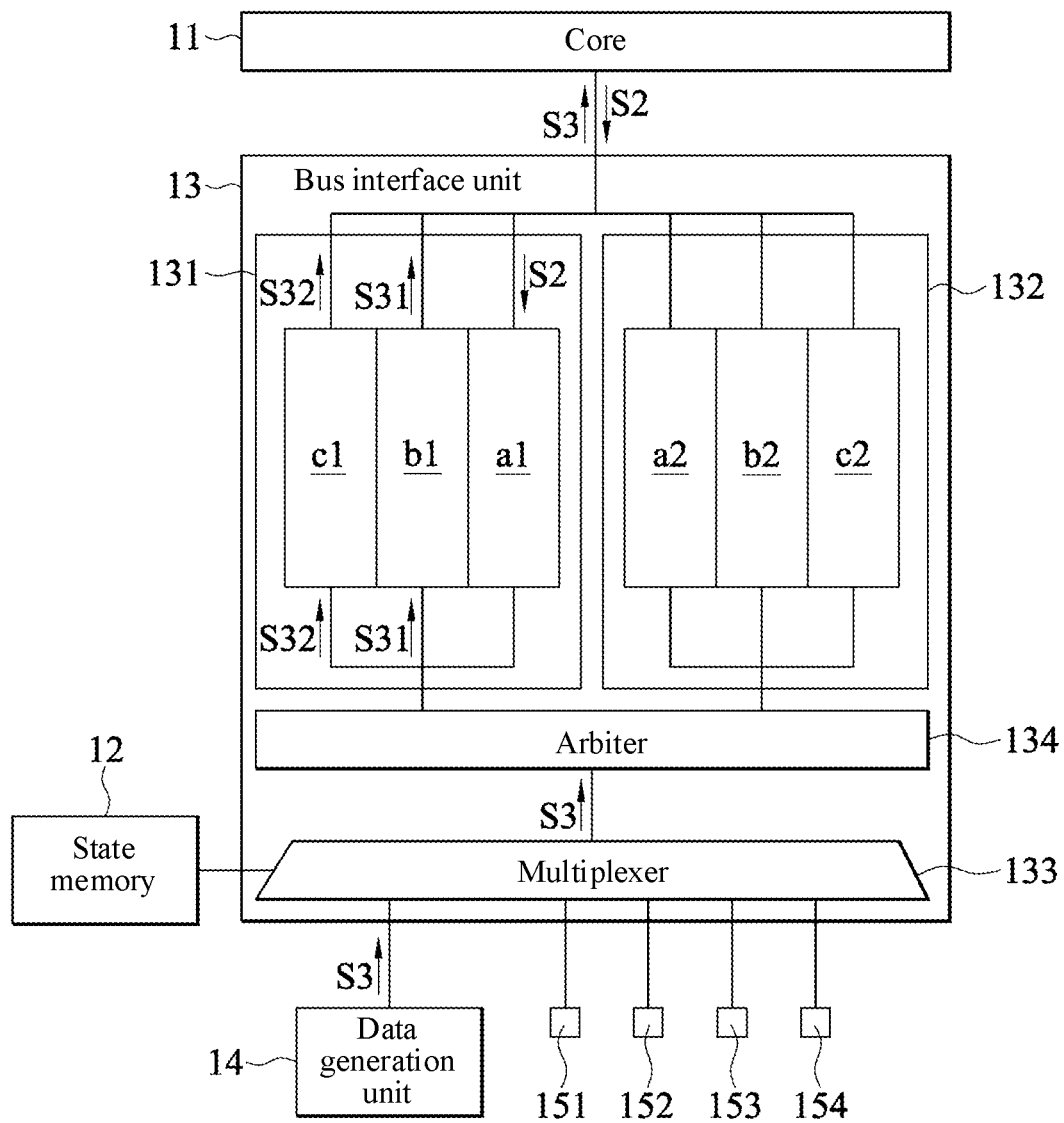
FIG. 3 is a block diagram of an embodiment of a bus interface unit in FIG. 1 or FIG. 2.

In some embodiments, as shown in FIG. 1 to FIG. 3, the bus interface unit 13 includes a plurality of register circuits, a multiplexer 133 and an arbiter 134. The register circuits may include two types, such as a command side circuit 131 and a data side circuit 132. The command side circuit 131 and the data side circuit 132 are respectively coupled between the core 11 and the arbiter 134, the command side circuit 131 is configured to temporarily store and process a command that controls the core 11 to read the memory 20, and the data side circuit 132 is configured to temporarily store and process the data that the core 11 reads from and writes to the memory 20.

The command side circuit 131 may be divided into three areas, including a command side command area a1, a command side data area b1 and a command side response area c1. The command side command area a1 is configured to store a command side instruction from the core 11, and the command side data area b1 and the command side response area c1 are configured to respectively store the dummy data from the data generation unit 14 or the message transmitted by the memory 20 (via the bus contacts 151-154) as command side data and a command side response. The data side circuit 132 may be divided into three areas, including a data side command area a2, a data side data area b2 and a data side response area c2. The data side command area a2 is configured to store a data side instruction from the core 11, and the data side data area b2 and the data side response area c2 are configured to respectively store the dummy data from the data generation unit 14 or the message transmitted by the memory 20 as data side data and a data side response.

The multiplexer 133 is coupled to the state memory 12 and the arbiter 134. When the state of the state memory 12 shows the normal state, the multiplexer 133 couples the arbiter 134 to the bus contacts 151-154, and the arbiter 134 may selectively couple the multiplexer 133 to the command side circuit 131 or the data side circuit 132 according to the type of the message transmitted by the memory 20. When the state of the state memory 12 shows the intervening state, the multiplexer 133 couples the arbiter 134 to the data generation unit 14, and the arbiter 134 may selectively couple the multiplexer 133 to the command side circuit 131 or the data side circuit 132 according to the dummy data S3 generated by the data generation unit 14. Therefore, when the state of the state memory 12 shows the normal state, the core 11 can be coupled to the bus contacts 151-154 via the command side circuit 131 and/or the data side circuit 132; and when the state of the state memory 12 shows the intervening state, the core 11 can be coupled to the data generation unit 14 via the command side circuit 131 and/or the data side circuit 132.

In some embodiments, the data generation unit 14 determines whether the command side instruction and the data side instruction are stored in the command side command area a1 and the data side command area a2, and generates the dummy data corresponding to the command side instruction and the data side instruction. When determining that the dummy data corresponds to the command side instruction, the arbiter 134 couples the multiplexer 133 to the command side circuit 131; and when determining that the dummy data corresponds to the data side instruction, the arbiter 134 couples the multiplexer 133 to the data side circuit 132.

In some embodiments, for example, as shown in FIG. 1 to FIG. 3, when the core 11 wants to read a message from the memory 20, the core 11 transmits the read instruction S2 to the bus interface unit 13, and when the content of the read instruction S2 belongs to the aforementioned command, the bus interface unit 13 transmits the read instruction S2 to the command side command area a1 of the command side circuit 131 to store the read instruction S2 as the command side instruction, and the core 11 waits for the memory 20 to return the message corresponding to the read instruction S2. When the core 11 fails to receive the message returned from the memory 20 for a period of time, the user may want to perform the debugging function of the CPU 10. However, at this moment, the CPU 10 may be unable enter the debug mode because the core 11 is still waiting for the message. In this case, the user can use the debugging device 40 to transmit the signal S1 to the debugging unit 17 via the communication port 18, the debugging unit 17 may override the state of the state memory 12 from the normal state to the intervening state according to the signal S1, and the multiplexer 133 in the bus interface unit 13 switches the arbiter 134 from being coupled to the bus contacts 151-154 to being coupled to the data generation unit 14 according to the intervening state of the state memory 12. When the data generation unit 14 determines that the read instruction S2 (e.g., command side instruction) is stored in the command side command area a1, the data generation unit 14 generates the dummy data S3 corresponding to the read instruction S2, the data generation unit 14 transmits the dummy data S3 to the arbiter 134 via the multiplexer 133, and the arbiter 134 transmits the dummy data S3 to the command side circuit 131.

Since the dummy data S3 corresponds to the command side instruction stored in the command side instruction area a1 and the command side instruction is an instruction (read instruction S2) configured to read the memory 20, the dummy data S3 may at least include command side data S31 and a command side response S32, the command side response S32 and the command side data S31 correspond to each other. The command side response S32 is configured to indicate that the command side data S31 is valid information or invalid information. The arbiter 134 transmits the command side data S31 of the dummy data S3 to the command side data area b1 and store therein, and transmits the command side response S32 of the dummy data S3 to the command side response area c1 and store therein. Subsequently, the bus interface unit 13 obtains the dummy data S3 including the command side data S31 and the command side response S32 from the command side data area b1 and the command side response area c1, and transmits the dummy data S3 to the core 11. When the core 11 determines that the dummy data S3 (including the command side data S31 and the command side response S32) corresponding to the read instruction S2 is received, the core 11 can escape from waiting for the message returned from the memory 20, so that the CPU 10 can respond to the debugging request t and can enter the debug mode successfully.

Figure 4:
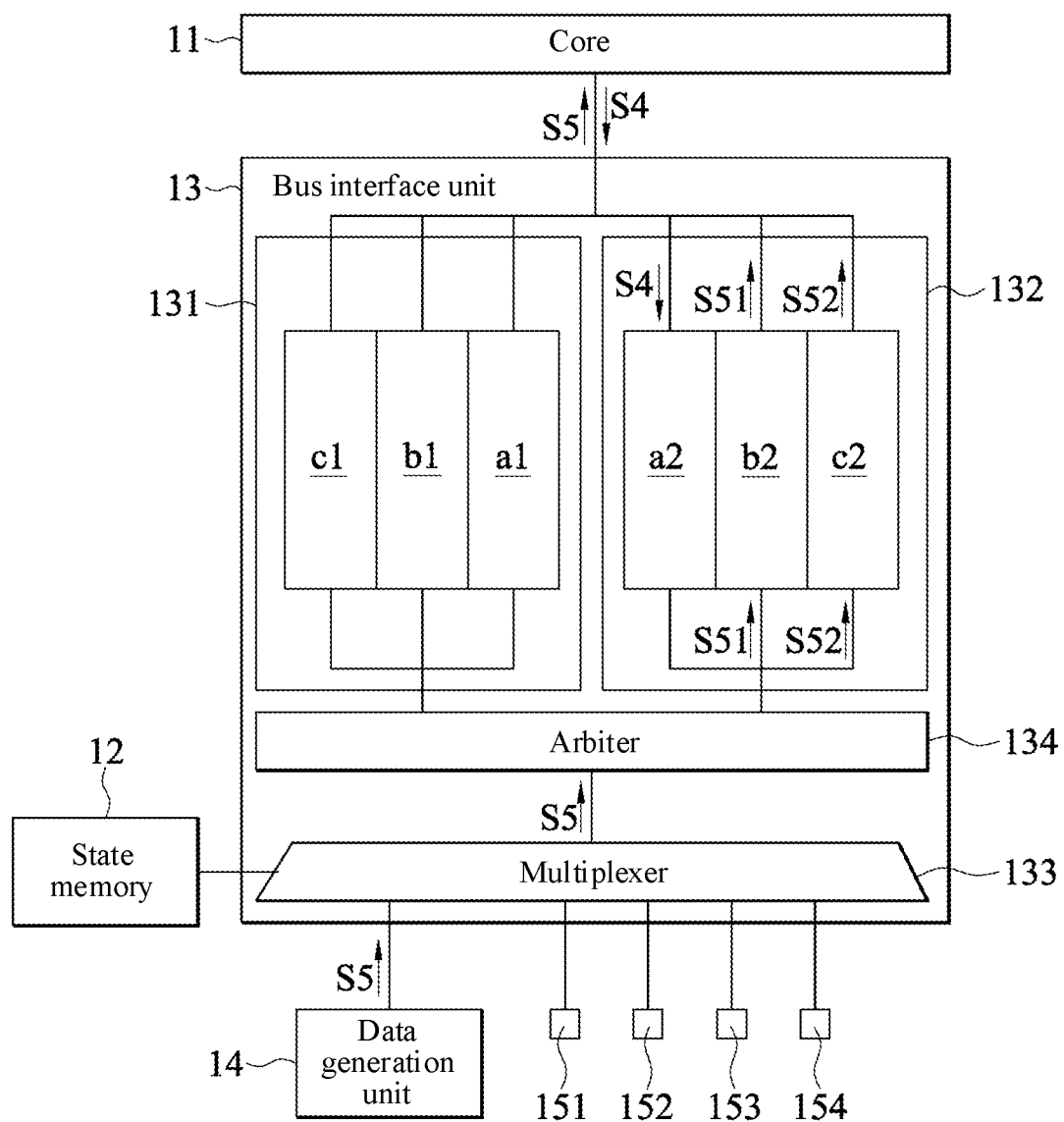
FIG. 4 is a block diagram of an alternative embodiment of the bus interface unit in FIG. 1 or FIG. 2.

In some other embodiments, for example, as shown in FIG. 1, FIG. 2 and FIG. 4, when the core 11 aims to read another message from the memory 20, the core 11 transmits a read instruction S4 of which the read content belongs to data to the bus interface unit 13, and the bus interface unit 13 transmits the read instruction S4 to the data side command area a2 of the data side circuit 132 to store the read instruction S4 as the data side instruction. When the core 11 fails to receive the message corresponding to the read instruction S4 returned from the memory 20 for a period of time and cannot finish waiting for the return message, the user may want to perform the debugging function on the CPU 10. The user can use the debugging device 40 to transmit the signal S1 to the debugging unit 17 to set the state of the state memory 12 to the intervening state, and the multiplexer 133 couples the arbiter 134 to the data generation unit 14 according to the intervening state. The data generation unit 14 determines that the read instruction S4 as the data side instruction is stored in the data side command area a2, and the data generation unit 14 generates dummy data S5 corresponding to the read instruction S4. Since the read instruction S4 is stored in the data side command area a2, the arbiter 134 couples the multiplexer 133 to the data side circuit 132, and the dummy data S5 generated by the data generation unit 14 is transmitted to the data side circuit 132 via the multiplexer 133 and the arbiter 134.

Since the dummy data S5 corresponds to the read instruction S4 stored in the data side command area a2 and the read instruction S4 is an instruction for reading data in the memory 20, the dummy data S5 may include data side data S51 and a data side response S52, wherein the data side response S52 and the data side data S51 correspond to each other. The data side response S52 is configured to indicate that the data side data S51 is valid information or invalid information. The arbiter 134 transmits the data side data S51 to the data side data area b2 and store therein, and transmits the data side response S52 to the data side response area c2 and store therein. The bus interface unit 13 obtains the dummy data S5 including the data side data S51 and the data side response S52 from the data side data area b2 and the data side response area c2, and transmits the dummy data S5 to the core 11. When the core 11 determines that the dummy data S5 (including the data side data S51 and the data side response S52) corresponding to the read instruction S4 is received, the core 11 can escape from waiting for the message returned from the memory 20, so that the CPU 10 can respond to the debugging request and enter the debug mode.

Figure 5:
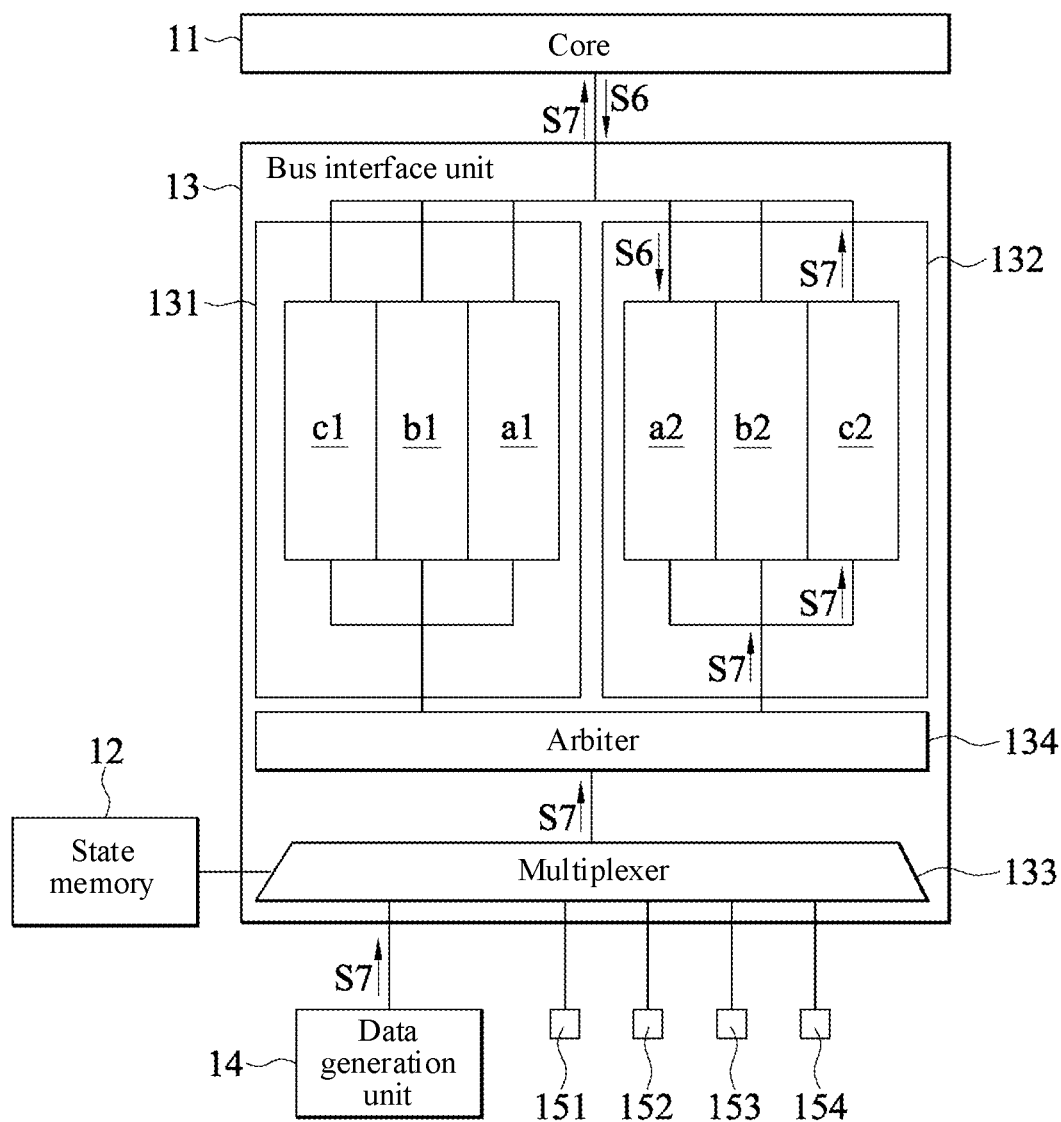
FIG. 5 is a block diagram of an alternative embodiment of the bus interface unit in FIG. 1 or FIG. 2.

In some other embodiments, for example, as shown in FIG. 1, FIG. 2 and FIG. 5, when the core 11 aims to write another message of which the content belongs to data to the memory 20, the core 11 transmits a write instruction S6 to the bus interface unit 13, and the bus interface unit 13 transmits the write instruction S6 to the data side command area a2 of the data side circuit 132 to store the write instruction S6 as the data side instruction. When the core 11 fails to receive the message of successful write returned from the memory 20 for a period of time and cannot finish waiting for the return message, the user may want to perform the debugging function on the CPU 10. The user can use the debugging device 40 to transmit the signal S1 to the debugging unit 17 to set the state of the state memory 12 to the intervening state, and the multiplexer 133 couples the arbiter 134 to the data generation unit 14 according to the intervening state. The data generation unit 14 determines that the write instruction S6 as the data side instruction is stored in the data side command area a2, and the data generation unit 14 generates dummy data S7 corresponding to the write instruction S6. Since the write instruction S6 is stored in the data side command area a2, the arbiter 134 couples the multiplexer 133 to the data side circuit 132, and the dummy data S7 generated by the data generation unit 14 is transmitted to the data side circuit 132 via the multiplexer 133 and the arbiter 134.

Since the dummy data S7 corresponds to the write instruction S6 stored in the data side command area a2 and the write instruction S6 is an instruction for writing data to the memory 20, the dummy data S7 may not include the data side data and only includes the data side response. The dummy data S7 and the write instruction S6 correspond to each other, and the dummy data S7 is configured to indicate whether the data is successfully written to the memory 20. The arbiter 134 stores the dummy data S7 as the data side response in the data side response area c2, and the bus interface unit 13 obtains the dummy data S7 from the data side response area c2 and transmits the dummy data to the core 11. Because the core 11 determines that the dummy data S7 corresponding to the write instruction S6 is received, the core 11 finishes waiting for the message returned from the memory 20, and then, the CPU 10 can enter the debug mode.

In some embodiments, the length of the command side data may be substantially identical to the length of the command side instruction, and the length of the data side data may be substantially identical to the length of the data side instruction. For example, both the length of the command side data and the length of the command side instruction may be 4 bits, or both the length of the data side data and the length of the data side instruction may be 4 bits, and the length of the command side response and the data side response may be 1 bit. In some embodiments, the command side data, the data side data, the command side response and the data side response are all dummy data generated by the data generation unit 14, so the content of the command side data, the data side data, the command side response and the data side response may include arbitrary values.

Figure 6:
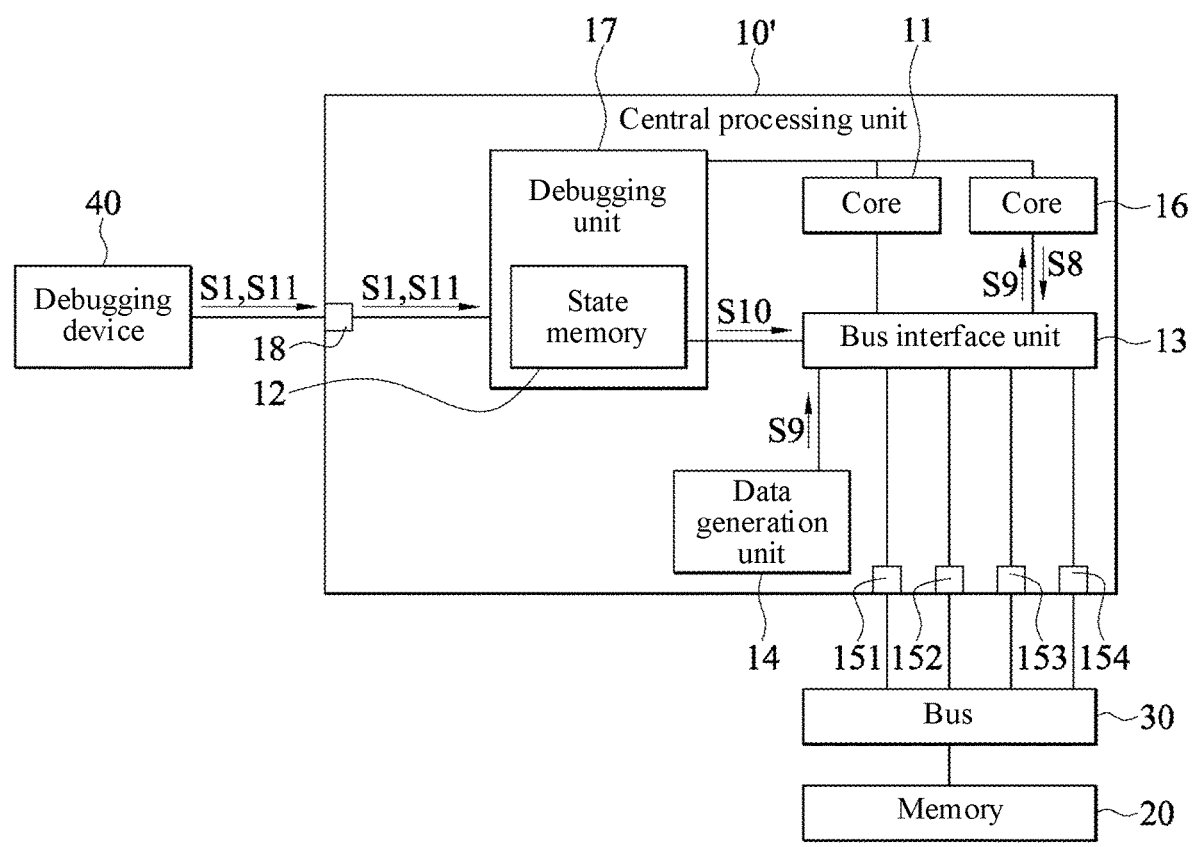
FIG. 6 is a block diagram of an alternative embodiment of the CPU according to the present disclosure.

In some embodiments, the CPU may have a plurality of cores, and the number of the cores is not limited in the present disclosure. Referring to FIG. 6 in conjunction with FIG. 1 to FIG. 5, a CPU 10' includes two cores 11 and 16. The operations between the core 16 and the state memory 12, the bus interface unit 13, the memory 20 and the data generation unit 14 are the same as those described for the core 11 in the above-mentioned embodiments, so an embodiment is briefly described below. When the core 16 wants to read or write a message stored in the memory 20, the core 16 transmits an instruction S8 to the command side command area a1 of the command side circuit 131 via the bus interface unit 13 so as to store it as a command side instruction (i.e., when the content of the instruction S8 corresponds to a command), or transmits the instruction S8 to the data side command area a2 of the data side circuit 132 so as to store it as a data side instruction (i.e., when the content of the instruction S8 corresponds to data). When the core 16 fails to receive the message corresponding to the instruction S8 returned from the memory 20 for a period of time and cannot finish waiting for the return message, the user may want to perform the debugging function on the CPU 10, the user can use the debugging device 40 to transmit the signal S1 to the debugging unit 17 (via the communication port 18), and the debugging unit 17 sets the state of the state memory 12 from the normal state to the intervening state according to the signal S1. The multiplexer 133 in the bus interface unit 13 couples the arbiter 134 to the data generation unit 14 according to the intervening state. The data generation unit 14 then generates corresponding dummy data S9 according to the instruction S8 stored in the command side command area a1 or the data side command area a2. According to the storage position of the instruction S8 (command side or data side), the arbiter 134 couples the multiplexer 133 to the command side circuit 131 or the data side circuit 132, and the data generation unit 14 transmits the dummy data S9 to the command side circuit 131 or the data side circuit 132 via the multiplexer 133 and the arbiter 134. According to the corresponding instruction S8, the arbiter 134 respectively stores the data or response included in the dummy data S9 into the corresponding command side data area b1, data side data area b2, command side response area c1 and data side response area c2. The bus interface unit 13 obtains the dummy data S9 from the data areas b1 and b2 and the response areas c1 and c2, and transmits the dummy data to the core 16. The core 16 determines that the dummy data S9 corresponding to the instruction S8 is received, and the core 16 finishes waiting for the message returned from the memory 20 so that the CPU 10 can enter the debug mode successfully.

In some embodiments, in order to be able to clearly identify which cores the read instructions and write instructions transmitted by the plurality of cores are from, both the read instruction and the write instruction respectively include identification codes (IDs) corresponding to respective cores. In the command side command area a1 and the data side command area a2, the command side instruction and the data side instruction corresponding to the read instruction and the write instruction also include IDs corresponding to respective cores. In other words, after being stored as a command side instruction or a data side instruction respectively, the read instruction S2, the read instruction S4 and the write instruction S6 all include IDs corresponding to the core 11; and after being stored as a command side instruction or a data side instruction, the instruction S8 also includes an ID corresponding to the core 16. Furthermore, the dummy data S3, S5 and S7 corresponding to the read instruction S2, the read instruction S4 and the write instruction S6 also include IDs corresponding to the core 11, and the dummy data S9 corresponding to the instruction S8 also includes an ID corresponding to the core 16. In more detail, the command side data S31 stored in the command side data area b1, the command side response S32 stored in the command side response area c1, the data side data S51 stored in the data side data area b2 and the data side response S52 stored in the data side response area c2 all include IDs corresponding to core 11; after being stored as the command side response, the dummy data S7 also includes an ID corresponding to the core 11; and the data or response included in the dummy data S9 also includes an ID corresponding to the core 16. Therefore, the bus interface unit 13 can correctly transmit the dummy data S3, S5 and S7 to the core 11 according to the above IDs corresponding to the core 11, and correctly transmit the dummy data S9 to the core 16 according to the ID corresponding to the core 16.

In some embodiments, the data generation unit 14 may be software, hardware, firmware, etc., and the data generation unit 14 may also be a combined logic circuit. When the data generation unit 14 is a logic circuit, the data generation unit 14 is in a standby state at any time. When the bus interface unit 13 couples the cores 11 and 16 to the data generation unit 14, the data generation unit 14 outputs the generated dummy data S3, S5, S7 and S9 to the cores 11 and 16 via the bus interface unit 13.

In conclusion, when the core transmits read and write instructions to the memory and the core fails to operate and wait because it cannot receive the message returned from the memory, the user may want to interrupt the core operation to operate the CPU to enter the debug mode, the user can switch the state of the state memory to the intervening state, the multiplexer in the bus interface unit switches the core from being coupled to the memory to being coupled to the data generation unit, and the data generation unit generates the dummy data transmitted to the core via the bus interface unit. Because the dummy data corresponds to the read and write instructions, the core stops waiting for the message returned from the memory, and the user can operate the CPU to enter the debug mode. In addition, in the bus interface, the temporary storage circuit area is divided into the command side circuit and the data side circuit, and then, areas of the command side circuit and the data side circuit are divided into the command area, the data area and the response area, therefore, the bus interface can be more orderly when temporarily storing and processing dummy data. Furthermore, according to the IDs corresponding to the core in the instruction, data and response, transmission errors can be avoided when the dummy data is transmitted to the core, the core accurately receives the dummy data, and the CPU can enter the debug mode smoothly. According to the above, it cannot only solve the problem that the CPU cannot enter the debug mode due to unfinished read and write, but also can use a simpler and more efficient way than a conventional way to make the CPU enter the debug mode, so that additional burden on the CPU in complexity and debugging cannot be caused.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. A central processing unit, comprising:
a core, configured to operate in a normal operation mode and to enter a debug mode from the normal operation mode in response to a request;
a state memory, configured to store a state, wherein the state is a normal state or an intervening state;
a plurality of bus contacts;
a data generation unit, configured to generate dummy data; and
a bus interface unit, coupled to the core and the state memory, wherein the bus interface unit is configured to couple the core to the plurality of bus contacts in response to the normal state stored in the state memory; and
wherein, in response to that the core fails to respond to the request for entering the debug mode from the normal operation mode: the state stored in the state memory is changed from the normal state to the intervening state in response to an intervening signal, the bus interface unit couples the core to the data generation unit in response to the intervening state stored in the state memory, and the core enters the debug mode after receiving the dummy data from the data generation unit.

2. The central processing unit according to claim 1, wherein the bus interface unit comprises:

a command side circuit, comprising:
   a command side command area, configured to store a command side instruction from the core;
   a command side data area, configured to store command side data; and
   a command side response area, configured to store a command side response; and
a data side circuit, comprising:
   a data side command area, configured to store a data side instruction from the core;
   a data side data area, configured to store data side data; and
   a data side response area, configured to store a data side response,
wherein, when the state shows the intervening state and the dummy data corresponds to the command side instruction, the bus interface unit stores the dummy data in the command side data area and the command side response area; and when the state shows the intervening state and the dummy data corresponds to the data side instruction, the bus interface unit stores the dummy data in the data side data area and the data side response area.

3. The central processing unit according to claim 2, further comprising a debugging unit and a communication port, wherein the debugging unit is coupled to the communication port, the core and the state memory, and wherein the debugging unit sets the state to the normal state and sets the state to the intervening state according to the intervening signal of the communication port.

4. The central processing unit according to claim 2, further comprising a debugging unit and a communication port, wherein the debugging unit comprises the state memory, the debugging unit is coupled to the communication port, the core and the bus interface unit, and wherein the debugging unit sets the state to the normal state and sets the state to the intervening state according to the intervening signal of the communication port.

5. The central processing unit according to claim 4, wherein the bus interface unit comprises a multiplexer; when the state shows the normal state, the multiplexer couples the core to the plurality of bus contacts; and when the state shows the intervening state, the multiplexer couples the core to the data generation unit.

6. The central processing unit according to claim 5, wherein the bus interface unit comprises an arbiter, and the arbiter selectively couples the multiplexer to the command side circuit or the data side circuit.

7. The central processing unit according to claim 3, wherein the bus interface unit comprises a multiplexer; when the state shows the normal state, the multiplexer couples the core to the plurality of bus contacts; and when the state shows the intervening state, the multiplexer couples the core to the data generation unit.

8. The central processing unit according to claim 7, wherein the bus interface unit comprises an arbiter, and the arbiter selectively couples the multiplexer to the command side circuit or the data side circuit.

9. The central processing unit according to claim 2, wherein the bus interface unit comprises a multiplexer; when the state shows the normal state, the multiplexer couples the core to the plurality of bus contacts; and when the state shows the intervening state, the multiplexer couples the core to the data generation unit.

10. The central processing unit according to claim 9, wherein the bus interface unit comprises an arbiter, and the arbiter selectively couples the multiplexer to the command side circuit or the data side circuit.

11. A central processing unit, comprising:
   a plurality of cores, configured to operate in a normal operation mode and to enter a debug mode from the normal operation mode in response to a request;
   a state memory, configured to store a state, wherein the state is a normal state or an intervening state;
   a plurality of bus contacts;
   a data generation unit, configured to generate dummy data; and
   a bus interface unit, coupled to the cores and the state memory, wherein the bus interface unit is configured to couple one of the plurality of cores to the plurality of bus contacts in response to the normal state stored in the state memory; and
   wherein, in response to that the one of the cores fails to respond to the request for entering the debug mode from the normal operation mode: the state stored in the state memory is changed from the normal state to the intervening state in response to an intervening signal, the bus interface unit couples the one of the cores to the data generation unit in response to the intervening state stored in the state memory, and the one of the cores enters the debug mode after receiving the dummy data from the data generation unit.

12. The central processing unit according to claim claim 11, wherein the bus interface unit comprises:
   a command side circuit, comprising:
      a command side command area, configured to store a command side instruction from the one of the plurality of cores;
      a command side data area, configured to store a command side data; and
      a command side response area, configured to store a command side response; and
   a data side circuit, comprising:
      a data side command area, configured to store a data side instruction from the one of the plurality of cores;
      a data side data area, configured to store a data side data; and
      a data side response area, configured to store a data side response,
   wherein, when the state shows the intervening state and the dummy data corresponds to the command side instruction, the bus interface unit stores the dummy data in the command side data area and the command side response area; and when the state shows the intervening state and the dummy data corresponds to the data side instruction, the bus interface unit stores the dummy data in the data side data area and the data side response area.

13. The central processing unit according to claim 12, wherein the command side instruction and the data side instruction from the core comprise an identification code corresponding to the core, and the data generation unit generates the dummy data comprising the identification code of the core according to the identification code of the core.

14. The central processing unit according to claim 12, further comprising a debugging unit and a communication port, wherein the debugging unit is coupled to the communication port, the plurality of cores and the state memory, and wherein the debugging unit sets the state to the normal state and sets the state to the intervening state according to the intervening signal of the communication port.

15. The central processing unit according to claim 14, wherein the bus interface unit comprises a multiplexer;

when the state shows the normal state, the multiplexer couples the core to the plurality of bus contacts; and when the state shows the intervening state, the multiplexer couples the core to the data generation unit.

16. The central processing unit according to claim 12, further comprising a debugging unit and a communication port, wherein the debugging unit comprises the state memory, the debugging unit is coupled to the communication port, the core and the bus interface unit, and wherein the debugging unit sets the state to the normal state and sets the state to the intervening state according to the intervening signal of the communication port.

17. The central processing unit according to claim 16, wherein the bus interface unit comprises a multiplexer; when the state shows the normal state, the multiplexer couples the core to the plurality of bus contacts; and when the state shows the intervening state, the multiplexer couples the core to the data generation unit.

18. The central processing unit according to claim 12, wherein the bus interface unit comprises a multiplexer; when the state is the normal state, the multiplexer couples the core to the plurality of bus contacts; and when the state is the intervening state, the multiplexer couples the core to the data generation unit.

* * * * *